US011907929B2

(12) United States Patent
Borras et al.

(10) Patent No.: US 11,907,929 B2
(45) Date of Patent: Feb. 20, 2024

(54) METHOD AND SYSTEM FOR DETECTING MULTIPLE USERS TRAVELING TOGETHER AND CHARGING A SINGLE TOLL AMONG THE USERS AUTOMATICALLY

(71) Applicant: GEOTOLL, INC., Plantation, FL (US)

(72) Inventors: Jaime Andres Borras, Miramar, FL (US); Wyatt Drake Geist, Davie, FL (US)

(73) Assignee: GEOTOLL, INC., Plantation, FL (US)

( * ) Notice: Subject to any disclaimer, the term of this patent is extended or adjusted under 35 U.S.C. 154(b) by 0 days.

(21) Appl. No.: 18/107,411

(22) Filed: Feb. 8, 2023

(65) Prior Publication Data

US 2023/0252447 A1 Aug. 10, 2023

Related U.S. Application Data

(60) Provisional application No. 63/307,682, filed on Feb. 8, 2022.

(51) Int. Cl.
G06Q 20/32 (2012.01)
(52) U.S. Cl.
CPC ..... *G06Q 20/3224* (2013.01); *G06Q 2240/00* (2013.01)
(58) Field of Classification Search
CPC ................ G06Q 20/3224; G06Q 2240/00
(Continued)

(56) References Cited

U.S. PATENT DOCUMENTS

| 8,587,454 | B1 * | 11/2013 | Dearworth | ........... | G07B 15/063 |
| | | | | | 340/5.1 |
| 2011/0136468 | A1 * | 6/2011 | McNamara | ............ | G06Q 20/14 |
| | | | | | 455/406 |

(Continued)

FOREIGN PATENT DOCUMENTS

CN 110166512 A * 8/2019 ......... G06Q 30/0207

OTHER PUBLICATIONS

"Travel Time on Arterials and Rural Highways: State-of-the-Practice Synthesis on Arterial Data Collection Technology," Mar. 22, 2021 (Year: 2021).*

(Continued)

*Primary Examiner* — Omar Zeroual
*Assistant Examiner* — Brian Adams Heflin
(74) *Attorney, Agent, or Firm* — The Concept Law Group, PA; Scott M. Garrett; Scott D. Smiley

(57) ABSTRACT

Mobile devices are each associated with a respective toll account and are also configured to periodically report their location and related information while traveling in a vehicle, which is used to determine any applicable toll fees. In order to avoid assessing the toll fee to each account, a server of a tolling service first identifies mobile devices that are traveling together based on the location information, and then determines which of the mobile devices, if any, has indicated that it is connected to the vehicle audio system. The account associated with the mobile device connected to the vehicle audio system will be assessed the full toll fee, and the accounts associated with the other mobile devices will not be charged. If there is no indication of being connected to the vehicle audio system, then the location information is used to correlate the mobile devices with a license plate image taken at a tolling location, and the account associated with the license plate number will be assessed the toll fee.

11 Claims, 8 Drawing Sheets

(58) Field of Classification Search
USPC .......................................................... 705/13
See application file for complete search history.

(56) References Cited

U.S. PATENT DOCUMENTS

| | | | | |
|---|---|---|---|---|
| 2013/0030882 | A1* | 1/2013 | Davis, III | G06Q 30/04 |
| | | | | 705/13 |
| 2014/0067488 | A1* | 3/2014 | James | G06Q 30/02 |
| | | | | 705/13 |
| 2015/0134427 | A1* | 5/2015 | Borras | G06Q 30/0284 |
| | | | | 705/13 |
| 2016/0012648 | A1* | 1/2016 | Fustes | G06Q 20/3255 |
| | | | | 705/13 |
| 2016/0345163 | A1* | 11/2016 | Monaghan | H04W 4/029 |
| 2018/0338225 | A1* | 11/2018 | Shimizu | H04W 4/40 |
| 2019/0279437 | A1* | 9/2019 | Borras | G07B 15/063 |
| 2019/0295408 | A1* | 9/2019 | Wynter | G06Q 50/30 |
| 2020/0156436 | A1* | 5/2020 | Urano | B60H 1/00771 |
| 2021/0086689 | A1* | 3/2021 | Campbell | B60Q 1/50 |
| 2022/0341742 | A1* | 10/2022 | Marcovitch | G01C 21/26 |

OTHER PUBLICATIONS

"Toll payment devices used to track vehicles on toll-free roads," by Edward Hasbrouck, Apr. 28, 2015 (Year: 2015).*

* cited by examiner

METHOD AND SYSTEM FOR DETECTING MULTIPLE USERS TRAVELING TOGETHER AND CHARGING A SINGLE TOLL AMONG THE USERS AUTOMATICALLY

CROSS REFERENCE

This application claims priority to U.S. provisional application No. 63/307,682 filed Feb. 8, 2022, the entirety of this is hereby incorporated by reference.

FIELD OF THE INVENTION

The present invention relates generally to vehicular tolling applications, and, more particularly, relates to the use of tolling applications on personal computing and communication devices in which multiple people in a vehicle have such devices with tolling applications running on them, and identifying that at least one of the users' toll accounts should be charged and the other user's toll account are not to be charged.

BACKGROUND OF THE INVENTION

Vehicular tolling is in widespread use and in a variety of forms. There are roadways that are exclusively toll roads, and there are roadways where one or several lanes are toll only, and other lanes are non-toll. Tolling has evolved from manned toll stations where drivers would have to stop and physically pay their toll, to more automated tolling methods such as toll by plate and mobile device application-based tolling. Presently there is substantial interest in using the resources and near ubiquitous presence mobile devices for tolling in which a tolling application is installed on the mobile device, and the application, when executed by the mobile device, uses resources of the mobile device such as communication and location services to determine when the user of the mobile device should pay a toll. That is, the mobile device tracks its location, and upon passing a tolling point, it can communicate with a tolling service (e.g. the entity who provided the application) to conduct a toll payment to the toll agency responsible for the toll road.

It is not uncommon for several people to be in a vehicle when traveling on a toll road, each of whom can have their own mobile device with a tolling application installed therein. Upon passing a tolling point, a passenger's toll account may be charged inadvertently because the passenger's mobile device does not know that it is not responsible for paying tolls. Of course, the tolling application can have a user setting to set the tolling application into a passenger mode, and ignore tolling operation, but users may forget to do this, or simply would prefer if the tolling application were able to determine this automatically.

Therefore, a need exists to overcome the problems with the prior art as discussed above.

SUMMARY

In accordance with some embodiments of the inventive disclosure, there is provided a method that includes receiving at a server a plurality of location reports from a plurality of mobile devices and evaluating each one of the plurality of location reports to determine whether there is another location report from a different mobile device that correlates to the one of the plurality of location reports being evaluated. The method further includes, upon identifying one or more correlated location reports, determining whether the mobile devices that produced the correlated location reports have read a common media access control address, and when it is determined that the mobile devices have each read the common media access control address, assessing a single toll fee to an account associated with one of the mobile devices and not assessing a toll fee to the different mobile device.

In accordance with a further feature, the method further includes, when it is determined that the mobile devices have not each read the common media access control address, assessing a full toll charge to toll accounts associated with each of the mobile devices.

In accordance with a further feature, determining whether the mobile devices that produced the correlated location reports have read the common media access control address comprises each of the mobile devices determining that they are in a vehicle based on reaching a threshold speed and reading a MAC address of a vehicle audio system of the vehicle.

In accordance with a further feature, the method further includes, when it is determined that the mobile devices have each read the common media access control address, the full toll charge is split among these users.

In accordance with a further feature, the method further includes, when it is determined that the mobile devices is paired with the vehicle audio system, an account associate with the mobile device that is paired is charged the full toll.

In accordance with some embodiments of the inventive disclosure, there is provided a method that includes receiving at a server a plurality of location reports from a plurality of mobile devices and evaluating each one of the plurality of location reports to determine whether there is another location report from a different mobile device that correlates to the one of the plurality of location reports being evaluated. The method further includes, upon identifying one or more correlated location reports, determining whether the mobile devices that produced the correlated location reports have read a common media access control address, and, when it is determined that the mobile devices have each read the common media access control address, applying a business rule to apportion a single toll fee among the mobile devices that have read the common media access control address.

In accordance with a further feature, the business rule results in the entire single toll fee to be assessed to a mobile device that is connected to the media access control address.

In accordance with a further feature, the business rule results in the single toll fee being divided among the mobile devices.

In accordance with some embodiments of the inventive disclosure, there is provided a method for identifying a plurality of mobile devices traveling together in a vehicle that includes receiving, at a server, a plurality of location reports from a plurality of mobile devices, wherein the location reports include location fix information taken when approaching and passing through a tolling location. The method further includes the server selecting a first location report from one mobile device of the plurality of mobile devices that indicates the one mobile device passed through the tolling location, and the server defining speed and distance boundaries based on location information in the first location report. The method further includes the server searching the plurality of location reports to identify other ones of the location reports that are within the speed and distance boundaries. The method further includes the server performing a statistical process on the other ones of the location reports to identify at least one other location report from at least one other mobile device that has a minimum likelihood of being in the same vehicle as the one mobile device.

In accordance with a further feature, the method further includes, determining which among the one mobile device and the at least one other mobile device to assess a toll fee.

In accordance with a further feature, performing a statistical process comprises determining a mean distance and a standard deviation in distance among the other ones of the location reports and the first location report, and excluding those of the other ones of the location reports that are more than the standard deviation away from the location of the first location report.

In accordance with a further feature, each of the plurality of location reports includes a sequence of locations.

In accordance with a further feature, the sequence of location reports are produced only within a defined distance from the tolling location.

Although the invention is illustrated and described herein as embodied herein, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. To the extent that the inventive disclosure relies on or uses software or computer implemented embodiments, the terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/ dynamic load library and/or other sequence of instructions designed for execution on a computer system. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
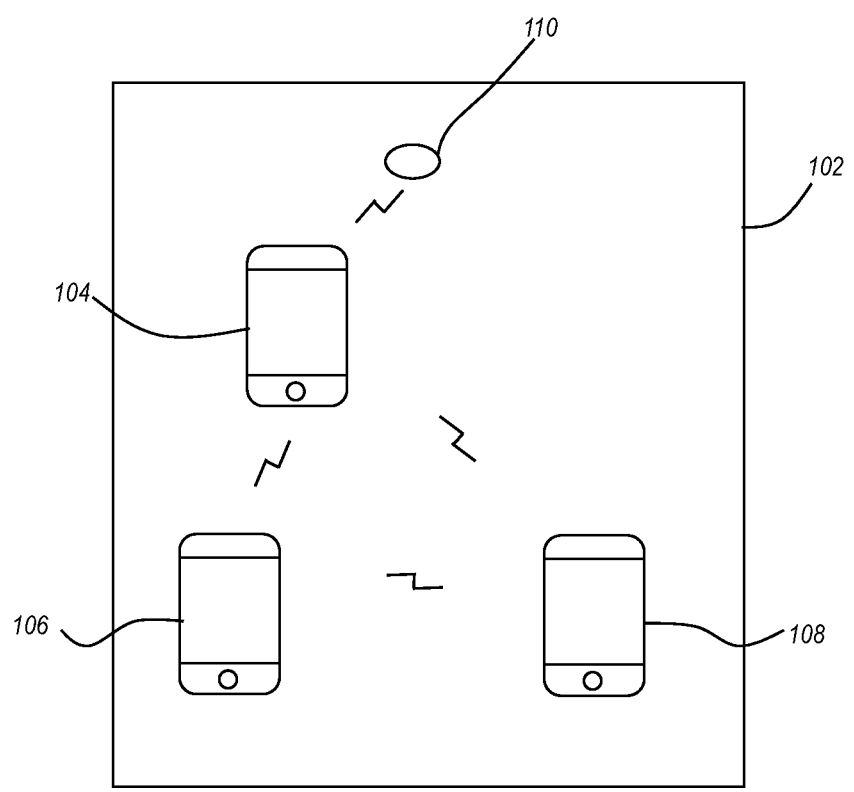
FIG. 1 shows a diagram of a vehicle including multiple mobile devices, each of which are running a tolling application program, and collect information from each other in order to prevent toll charges being applied to toll accounts associated with most of the mobile device, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

FIG. 1 shows a diagram of a vehicle 102 including multiple mobile devices 104, 106, 108, each of which are running a tolling application program, and collect information from each other in order to prevent toll charges being applied to toll accounts associated with most of the mobile devices, in accordance with some embodiments. As used here, the term "mobile device" refers to a computing device that is capable of accessing cellular data networks, and through those networks, the Internet and other computing resources that are connected to the Internet, including a tolling service data center. The term "tolling service" refers to a third party that pays toll charges on behalf of users of the tolling service to a toll agency that operates toll roads and collects tolls from drivers who use the toll roads. Thus, a tolling service is not a toll agency. The mobile devices 104, 106, 108 each have a tolling application program installed that can run as a background application. The tolling application program causes the mobile device to communicate with a tolling service data center to report location data and other data so that toll charges can be assessed to the one account associated with the user of the mobile device and the vehicle. In general a data center is a collection of computing resources including one or more servers, databases, and other data storage equipment that are interconnected and accessible via the Internet to process data sent to the data center and then take appropriate actions. When a mobile device passes a geofenced region defined as a tolling location (e.g. a physical toll gantry/plaza or a virtually defined tolling location), ordinarily the user's account would be debited the toll charge, and the toll charge would then be paid by the tolling service to the tolling agency. Since the tolling application can run in the background to automate the process of detecting when the mobile device is, for example, approaching and passing a tolling location, and reporting location to the tolling service data center, a user may forget to turn the tolling application off when traveling as a passenger in another person's vehicle on a toll road. In some circumstances this could result in both parties being charged tolls.

To prevent duplicative toll charges, the mobile devices 104, 106, 108 each have a personal area networking (PAN) transceiver that is capable of detecting beacon signals of other PAN transceivers. One example of a PAN communications protocol is that known by the tradename BLUETOOTH. The PAN communications protocol allows devices to link together for various purposes. For example, mobile device 104, which can belong to the owner/driver of the vehicle 102, can form a connection to the vehicle audio system 110 in a process known as pairing. When devices are paired, they will generally automatically link when in physical proximity of each other. In addition, PAN transceivers can detect each other without establishing any link because PAN transceivers routinely transmit a beacon so that they are discoverable in order to allow other devices to respond to them directly. In order to do this, there is certain information in the transmitted beacon that allows another device to address their communication to that other device. This information can include the media access control (MAC) address of the PAN transceiver. Every PAN transceiver is assigned a unique MAC address that is typically hard-coded into the transceiver. Each of the mobile devices 104, 106, 108 can report the presence of other mobile devices having a PAN transceiver by reporting the MAC addresses of the other detected devices, including the vehicle audio system 110 to the tolling service data center. However, to prevent the mobile devices from constantly reporting the MAC addresses of other mobile devices nearby, the application program is configured to only look at other device MAC addresses when the mobile device is moving above a threshold speed, such as, for example, fifteen miles per hour. That is, the tolling application program, running in the background, periodically request a location fix from the mobile device's satellite location receiver. A location fix indicates geolocation coordinates on the face of the Earth; latitude, longitude, and altitude, as well as time. Successive location fixes can be used to determine a present speed by determining a distance between the location fixes and the time it takes to travel that distance. Accordingly, when the vehicle 102 starts moving, and accelerates past the threshold speed, each of the mobile devices 104, 106, 108 will report to the data center, and indicate the MAC addresses of other devices nearby. Mobile device 104 can also indicate that is it connected to the vehicle audio system 110, which will indicate that it belongs to the owner/driver of the vehicle 102, and will be solely responsible for toll charges absent some indication of toll splitting/sharing. Thus, other mobile devices that indicate a similar trip point of origin (when they started exceeding the speed threshold) and which report the same neighboring MAC addresses, can then be excluded from being charged for tolls.

Alternatively, in some embodiments, mobile devices 106, 108 do not detect any other PAN transceivers, and only the driver's mobile device 104 connects to the vehicle audio system 110. Mobile devices 106, 108 do not report any MAC address or indication of having connected to any other PAN transceiver, but the driver's mobile device 104 does report an indication of having connected to the vehicle audio system, which can be simply a field in a data message sent to the tolling service data center, or the actual MAC address of the vehicle's audio system PAN transceiver. In some embodiments none of the mobile devices 104, 106, 108 report or indicate any connection to a PAN transceiver, in which case the tolling service data center still determines that the three mobile devices 104, 106, 108 were in the same vehicle together, and reports this information to the toll agency. The toll agency then correlates the information, especially the time of crossing the tolling location, and the lane the mobile devices 104, 106, 108 were in at the time of crossing (based on lane geofence definitions), and the tolling agency can then compare this information with license plate photos, which also include lane and crossing time data. The license plate of the vehicle can be associated with a tolling account.

Figure 2:
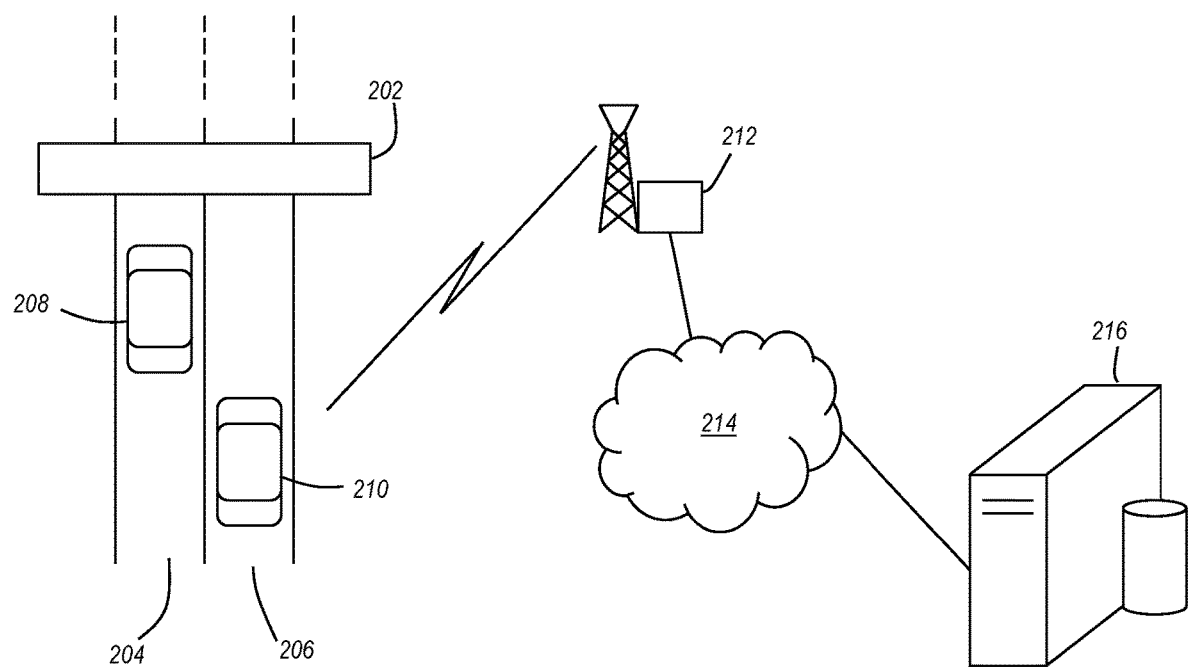
FIG. 2 shows system diagram of a tolling system in which mobile devices are collocated in a vehicle, and the system is able to determine which of the mobile devices are not presently operating as a tolling transactor in order to avoid charging excess toll, in accordance with some embodiments.

FIG. 2 shows system diagram of a tolling system in which mobile devices are collocated in a vehicle, and the tolling service data center is able to determine which of the mobile devices are not presently operating as a tolling transactor in order to avoid charging duplicate toll fees, in accordance with some embodiments. A tolling location 202 is defined over a roadway including lanes 204, 206. The tolling location can include physical equipment for toll transactions such as a gantry that includes a toll reader and a camera over each lane 204, 206. A toll reader transmits a signal when a vehicle is passing by, and a toll transponder in the vehicle can receive the toll reader signal and respond with an identifier that is associated with a toll account that is then debited. The camera is used to take a photograph of the license plate of the passing vehicle in case there is no toll transponder response as the vehicle passes the tolling location 202, or in case the tolling service data center cannot determine which of the plurality of mobile devices in a vehicle corresponds to the account to be charged. In which case the tolling agency determines the license plate of the vehicle based on position and crossing time information from photographs of license plated take at the tolling location as vehicles pass by the tolling location. The image of the license plate can be processed to recognize the license plate number, and origin (e.g. state/country). Once the license plate number is determined, then it can be cross referenced with toll accounts to determine if it is registered with any toll account, and if so, the toll account is then debited. If not, then a 'toll by plate' invoice is sent to the address of the owner of the vehicle.

In the present example there are two vehicles 208, 210. Vehicle 208 is in lane 204 and vehicle 210 is in lane 206, and both are traveling toward the tolling location 202. The two vehicles may arrive and pass the tolling location 202 at slightly different times, or at about the same time. For the sake of example, vehicle 210 can have multiple people in it who each have a mobile device that is running a tolling application program. Vehicle 208 will have at least a driver occupant who likewise has a mobile device that is running the tolling application program. The mobile devices can communicate with a cellular infrastructure network, that includes a base station 212, and that is further connected to the Internet 214. A tolling service data center 216 is also connected to the Internet 214, allowing the mobile devices in the vehicles 208, 210 to access the tolling service data center 216.

Once the vehicles reach the threshold speed (e.g. 15 mph), each of the mobile devices can report to the tolling service data center their location, time, and the nearby MAC addresses that can be detected, as well as their own MAC address if that information was not previously made a matter of record in the account information of the account associated with the mobile device. Alternatively, only the driver's mobile device reports a MAC address to indicate that the account associated with it is to be charged the full toll. Because the range of PAN transceivers is relatively short, the mobile devices are not likely to detect other devices outside of the vehicle. As such, it is very likely that the other PAN transceivers detected once the minimum speed threshold is passed are also located in the vehicle. In other embodiments none of the mobile devices report any MAC address or related information.

The tolling location 202, as well as portions of the lanes 204, 206 before and after the tolling location 202, can be defined by geofence definitions that are provided to the mobile devices by the tolling service data center, or as part of a tolling map used by each of the mobile devices. Once the mobile devices determine that they are approaching the tolling location 202, they can start collecting location information more frequently. For example, when the mobile devices determine that they are in a geofenced region defined on the lane prior to the tolling location they start collecting location, heading, speed, time, lane, and other information. This information is transmitted to the tolling service data center 216 which attempts to correlate the information with similar information reported by other mobile devices. If there are two or more mobile devices that appear to have arrived at the tolling location 202 at about the same time, going the same direction, and traveling at about the same speed and in the same lane or an adjacent lane (GPS error can make a device seem to be in an adjacent lane), then it may be that those devices are traveling together in the same vehicle. If there is an indication that the toll fees will be split or shared, then the toll fee is appropriately apportioned among the corresponding toll accounts. However, if there is no indication of toll sharing, then the tolling service data center 216 can determine, based on the MAC addresses of other devices detected by each mobile device, or the driver's mobile device alone reporting a MAC address (of the vehicle audio system), that the mobile devices are traveling in the same vehicle, and only one toll account is to be assessed the full toll fee. Generally this will be the account associated with the mobile device that is paired with the vehicle audio system, although a more express indication can be provided to the toll service data center (e.g. an option in the toll application program is selected indicating that the account of the user/owner of the mobile device will pay the full toll fees)can.

Figure 3:
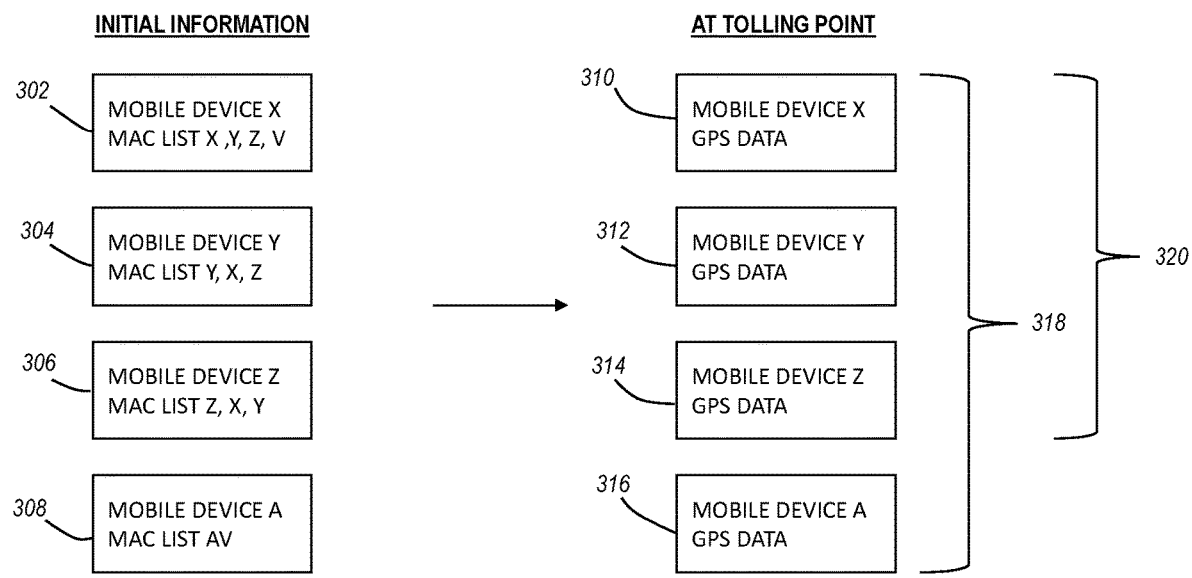
FIG. 3 is a data diagram that shows data sent to a backend server which uses the data to identify mobile devices associated with tolling accounts that are not to be charged a toll, in accordance with some embodiments.

FIG. 3 is a data diagram that shows data sent to a backend server which uses the data to identify mobile devices associated with tolling accounts that are not to be charged a toll, in accordance with some embodiments. For this example, there are mobile devices X, Y, Z, and A that are traveling on a toll road. Mobile devices X, Y, and Z can be, for example, in vehicle 210, and mobile device A can be traveling in vehicle 208. When vehicle 210 reaches the minimum speed threshold, then each of mobile devices, X, Y, and Z, can report initial information to the tolling service data center. Thus, mobile device X reports information 302, mobile device Y reports information 304, and mobile device Z reports information 306. Likewise, mobile device A reports information 308 when it first exceeds the minimum speed threshold. The initial information 302, 304, 306, 308 can include a location, the time at which the location fix was taken, speed, heading, and detected MAC addresses (X, Y, and Z) of other PAN transceivers that can be detected, as well as the PAN MAC address of the vehicle, V. Accordingly, initial information 302, 304, and 306 will all have a similar location, time, and common MAC addresses. Information 308 likely does not have a similar start location or time as that of 302, 304, 306, and only lists its own vehicle MAC address, AV.

However, assume vehicle 208 and vehicle 210 arrive at tolling location 202 at about the same time, but in adjacent lanes. Each of the mobile devices X, Y, Z, and A report information 310, 312, 314, and 316, respectively, to the tolling service data center. The tolling service data center 216 attempts to correlate information being reported as a result of passing by tolling locations. In this case all of the information reports 310, 312, 314, and 316 will have similar location, heading, and time correlations as indicated by bracket 318. They may further have similar speeds reported. However, the tolling service data center can check the initial reports 302, 304, 306, 308 and see that it is very likely that mobile devices X, Y, and Z are traveling in one vehicle, and mobile device A is traveling in another vehicle, based on their detected MAC address lists, as indicated by bracket 320. Accordingly, the account corresponding to mobile device A is charged a toll fee, and one of the accounts associated with mobile devices X, Y, or Z is charged a toll fee and the other two are not, thereby avoiding duplicative toll fees being assessed.

In another embodiment, rather than the mobile devices detecting each other, they can all detect the MAC address of the vehicle audio system (e.g. 110). The mobile devices having similar speed, location, and crossing times at a tolling location that also have identified a common MAC address (that of the vehicle audio system, for example) can be grouped together as traveling in the same vehicle. One of those mobile devices can further indicate that it is paired with the vehicle audio system, indicating it is the owner/driver's mobile device, and the account associated with that mobile device is the one that gets assessed the toll fee, assuming no toll sharing/splitting is being used. If the mobile devices report all of the MAC addresses detected in the vehicle, then they will still have reported common MAC addresses.

In some embodiments, only the mobile device of the driver of vehicle 210 can report a MAC address or equivalent indication that it is connected to the vehicle audio system. In which case, after correlating the mobile devices X, Y, and Z as being in the same vehicle, the toll fee is then assessed to the account associated with the driver's mobile device based on the driver's mobile device having indicated that it is connected to the vehicle audio system. In still other embodiments, none of the mobile devices X, Y, Z report or indicate connection to the vehicle audio system, in which case the tolling service must provide the tolling agency with the information of the three mobile devices X, Y, and Z being in the same vehicle, along with crossing time and lane information, so that a license plate recognition process can identify the vehicle and assess the toll fee to the account of the owner of the vehicle.

Figure 4:
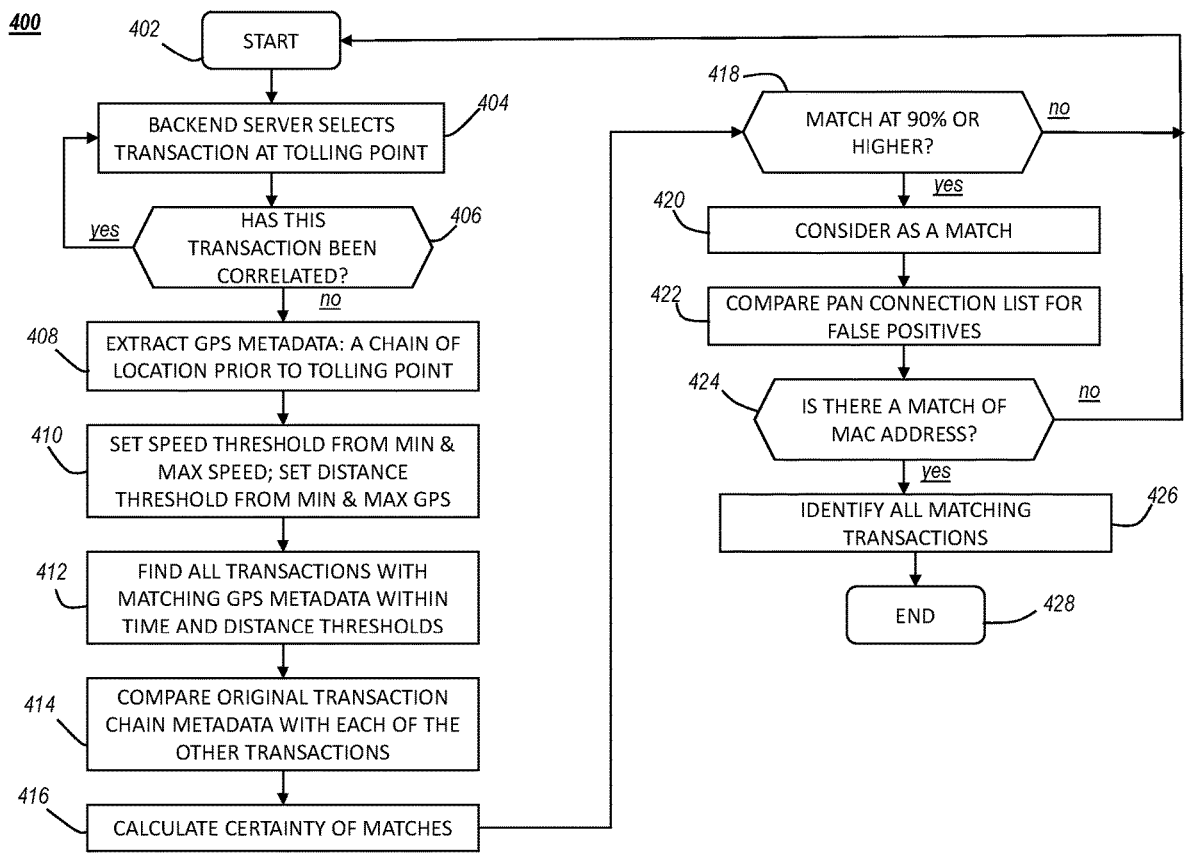
FIG. 4 is a flow chart diagram of a correlation method used by a toll service backend data center to identify multiple mobile devices traveling in the same vehicle to avoid excess tolling charges, in accordance with some embodiments.

FIG. 4 is a flow chart diagram of a correlation method 400 used by a toll service backend data center to identify multiple mobile devices traveling in the same vehicle to avoid assessing duplicative tolling charges, in accordance with some embodiments. At the start 402 of the method 400 the backend servers of the tolling service data center are receiving streams of location reports from many different mobile devices, each of which is running the tolling application. The tolling application causes the mobile device to periodically determine its location (both geo-coordinates and a geofence definition), time, heading, and speed, and to report that information to the backend data center, among other things relevant to the method 400. The location data includes location coordinates that are produced by the mobile device's satellite location receiver (e.g. GPS), as well as location metadata such as a user ID, date and time, car speed, bearing, GPS radius of accuracy, phone OS type, and GPS coordinates sequence number. The backend server processes each location report of a given mobile device and its metadata to identify matches with other mobile devices. That is, location reports that have the same location at the same time with the same speed and bearing. The matching process can be facilitated by indexing location reports in a database by time and date, location, speed, and bearing, for example. Location reports sufficiently close can be further processed when there is a sufficient match (e.g. 90% or more) by looking at the local PAN network entities available to each of the mobile devices that appear to be matching. Mobile devices that are collocated can advertise to each other using their personal area network transceiver (PAN) such as BLUETOOTH. Likewise, most vehicles made now include a PAN transceiver to allow mobile devices to connect to the vehicle audio system for hands-free telephone operation, if not also to play audio content over the vehicle audio system. PAN transceivers, like any networking transceiver, is assigned a media access control (MAC) address. The mobile devices in the vehicle can collect the MAC addresses of devices in the vehicle and the vehicle audio system and report these to the backend data center as well. If there are matches, then the backend knows they are in the same vehicle, and only one toll charge should be assessed. That is, the method 400 allows the backend data center to identify mobile devices that appear to be in the same vehicle, and then to verify that by comparing whether they can detect the same very short-range networking device(s). If the match cannot be made, or if they cannot be verified based on knowing common MAC address(es), then each device may assessed a toll. Alternatively, only the driver's mobile device will report an indication that it is connected to the vehicle audio system through a PAN link, and that indication will cause the tolling service data center to charge a toll to an account associated with the mobile device. In some embodiment no indication of connecting to or detecting any PAN transceiver is provided, and the tolling service data center determines, based on statistical analysis, which mobile devices that have reported their location are located together in a vehicle.

At step 404 the backend server selects a given transaction, meaning a mobile device has indicated that it has passed through a tolling location, which may result in a toll fee being assessed against a tolling account associated with the mobile device. In step 406 the server determines if the transaction has already been correlated with another mobile device. If the transaction has already been correlated with another, then the next transaction is selected, and the method returns to step 404. If the transaction has not been correlated with that of another mobile device, then the method proceeds to step 408 where the server evaluates a chain of location reports from the mobile device, including location and related metadata based on a predetermined amount of time prior and after the toll point. In step 410 the server determines boundaries for speed and distance, which act as filters to improve correlation, for comparison with the transaction being evaluated. That is, in addition to location and time being similar, the server will also look for other transactions that have a similar speed and are within a certain distance from the mobile device that produced the transaction being evaluated. In step 412 these parameters are used to find all other transactions (i.e. data from other mobile devices) that match the presently evaluated transaction within those bounds. In step 414 the presently evaluated transaction location chain is compared to those that were found to match, and for each one in step 416 a certainty of match is determined. That is, the more closely the location, speed, and distance match, the more likely the mobile device of the presently evaluated transaction was in the same vehicle as the mobile device that produced the matching transaction. A statistical likelihood can be calculated, and in step 418, those that are at least 90% likely to have been produced by mobile devices in the same vehicle are considered matches in step 420. If there are no matches that pass this evaluation, then a toll fee is assessed to the account associated with the mobile device that produced the presently evaluated transaction. In step 422 the server can compare the PAN connection list of each of the mobile devices that have matched in steps 418, 420, if such lists are reported. In steps 424 and 426 the transactions that also indicate a matching MAC address (e.g. in initial data reported) can be determined. Among these matching transaction, only one will be assessed the toll fee. That is, of all the matching transactions (location, speed, time, distance, and MAC addresses) only the account associated one of the mobile devices that produced the matching transactions is assessed the toll fee. That can be, for example, a mobile device that indicates that it was paired with the vehicle audio system. Then the method ends 428. If in step 424 there are no MAC address matches, then all of the transactions, despite matching otherwise, are considered to have been in different vehicles, a toll fee is assessed to the associated accounts for all of them, and the method returns to the start 402.

Alternatively, steps 422, 424 can be one step in which the server determines which, if any, of the mobile devices have reported or indicated connection to a PAN transceiver, such as by indicating a MAC address of the vehicle audio system. The mobile device indicating connection to the vehicle audio system is considered to be the owner/operator of the vehicle, and the toll fee is charged to the account associated with the driver's mobile device. In some embodiment, none of the mobile devices indicate being connected to the vehicle audio system, and the tolling service must provide the information to the tolling agency for cross referencing with license plate images to identity the owner/operator of the vehicle, and the toll account used by the owner/operator of the vehicle.

Figure 5A:
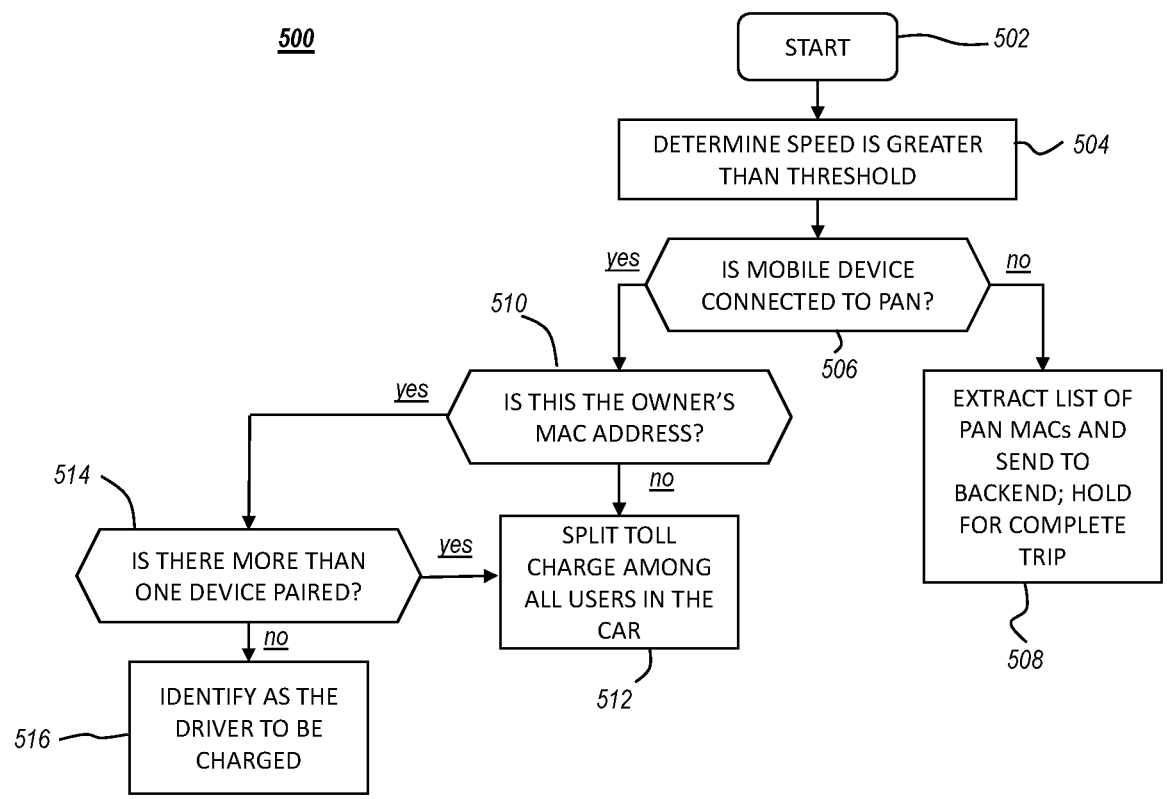
FIG. 5A is a flow chart diagram of a method for identifying locally available PAN devices to assist with the correlation method of FIG. 4, in accordance with some embodiments.

FIG. 5A is a flow chart diagram of a method 500 for identifying locally available PAN devices to assist with the correlation method 400 of FIG. 4, in accordance with some embodiments. Method 500 ensures that the identification of PAN MAC addresses is done only upon starting a trip or ride. The mobile devices can be programed by the tolling application to only look for PAN devices once the location information indicates the mobile device is moving at some threshold speed (e.g. 15 miles per hour). If a given device not connected to BlueTooth, it is not connected with the vehicle audio system, which means it is presumed to not be the vehicle owner's mobile device, which would be connected with vehicle audio system. In which case the mobile device simply maintains the list of MAC addresses until the end of the trip. If the mobile device is connected to the vehicle audio system, then it may be possible to split the toll between the owner and any other vehicle occupants. For example, multiple mobile devices, each owned by different members of a family who share the vehicle, may be paired with the vehicle audio system, while only one is connected. As used here, the term "paired" means that the mobile device and the vehicle audio system have been set up to be able to connect to each other through a pairing process, as is well known.

In step 502 there are several mobile devices, each running an instantiation of the tolling application program or an equivalent, co-located together in a vehicle. In step 504 each of the mobile devices separately measure their own speed, and when the speed is above a given threshold, the method proceeds to step 506. In step 506 the mobile device determines if it is connected to a PAN transceiver, such as the vehicle audio system. If not, then in step 508 the mobile device searches for all other PAN MAC addresses that can be detected, which will include those of other mobile devices in the vehicle. In step 510 if the mobile device is connected to a PAN transceiver in step 506, then the method evaluates whether the MAC address is the owner's MAC address. If not, then in step 512 the toll may be split among the users in the vehicle. Meaning the toll fee is apportioned to several toll accounts associated with the mobile devices in the vehicle. However, in step 514, if it is the owner's Mac address, then in step 516 the driver is identified as the entity to pay the toll fee.

Figure 5B:
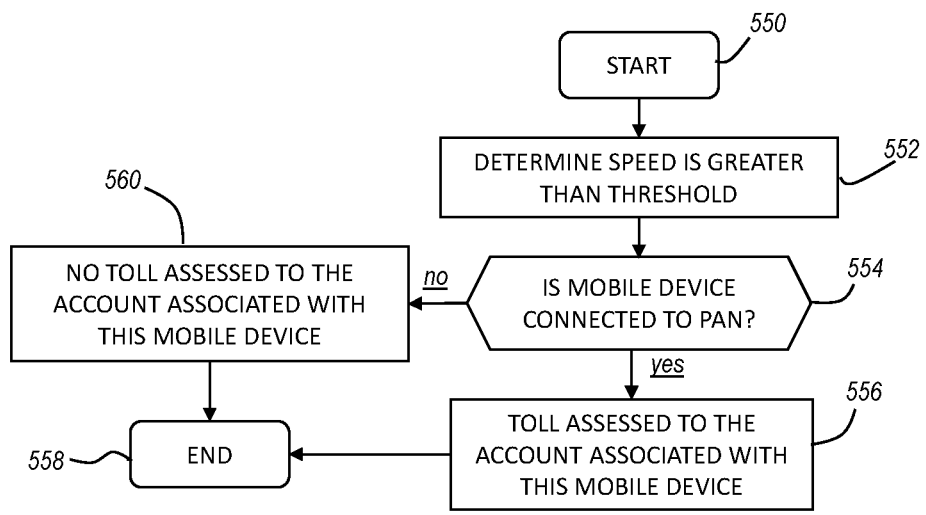
FIG. 5B is a flow chart diagram of a method for identifying which of several mobile devices traveling together in the same vehicle belong to the owner/operator of the vehicle so that the toll fee is assessed to an account associated with the owner/operator of the vehicle, and no toll is assessed to the accounts associated with the other mobile devices in the vehicle, in accordance with some embodiments.

FIG. 5B is a flow chart diagram of a method for identifying which of several mobile devices traveling together in the same vehicle belong to the owner/operator of the vehicle so that the toll fee is assessed to an account associated with the owner/operator of the vehicle, and no toll is assessed to the accounts associated with the other mobile devices in the vehicle, in accordance with some embodiments. At the start 550 there are several mobile devices located together in a vehicle, and each of the mobile devices are associated with a respective toll account and are each running a tolling application program. In step 552 each of the mobile devices determine that they are moving faster than the threshold speed, and in step 554 the application program on each mobile device is configured to determine if the mobile device is connected to the vehicle audio system's PAN transceiver. If the mobile device is connected to the vehicle audio system, then in step 556 this information is provided to the tolling service data center, either upon start of the trip, or with location reports, or both, and accordingly the tolling service data center will then charge the full toll to the account associated with the mobile device. In step 560, when a mobile device is not connected to the vehicle audio system, the tolling service data center will not assess any toll to the account associated with the mobile device, and the method ends 558.

Figure 6:
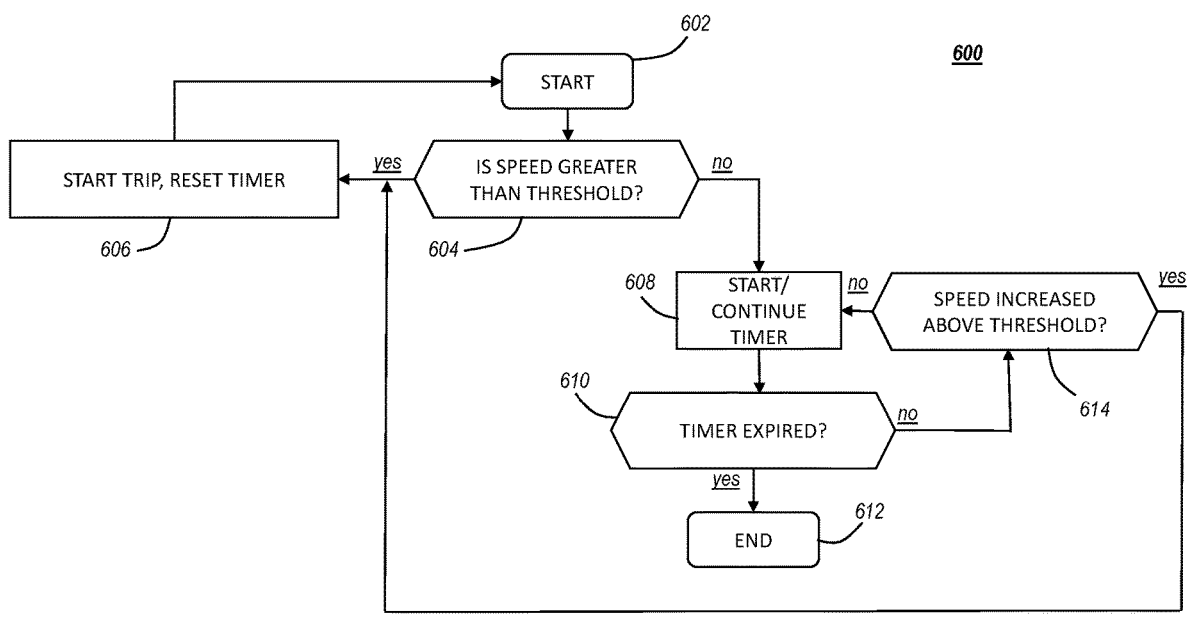
FIG. 6 is a flow chart diagram of a method for identifying when a trip begins and ends, in accordance with some embodiments.

FIG. 6 is a flow chart diagram of a method 600 for identifying when a trip begins and ends. The method starts by determining that the mobile device, based on location change over time, is moving at a threshold speed that is generally faster than walking, such as 15 mph, for example. The method runs a timer that counts up to a predetermined time, or down from a predetermined time value. At the start the timer is exhausted, or at its final value. Once the mobile device determines it is moving at or above the threshold speed, the timer is reset. Thereafter, if the speed drops below the threshold speed, the timer begins counting. Once the timer reaches its end value, then the trip is considered over. Each time a trip is undertaken the mobile device can begin the method 200 and communicate with the backend.

At the start 602 the mobile device is turned on and running the tolling application program, periodically obtaining location fixes. In step 604 the mobile device, as controlled by the tolling application program, compares successive location fixes to determine if the mobile device is moving faster than the threshold speed. If yes, then in step 606 a trip is considered under way, and the timer is reset. Initially the timer can be in an expired state and the method stays in step 604 until the speed exceeds the threshold the first time. Thereafter, while the speed remains above the threshold the method returns to step 604 until the speed drops below the threshold, where the timer is then started in step 608, and checked in step 610. If the timer expires, then it means the vehicle has been below the threshold speed for a substantial period of time, and the present trip is considered to be over, meaning the mobile device is not looking for geofenced regions indicating that it is approaching a tolling location. If in step 610 the timer is not (yet) expired, then in step 614 the speed of the mobile device is again re-evaluated, and if it is still below the threshold it returns to step 608 where the timer simply continues. However, if the speed rises above the threshold, then the method moves to step 606 where the timer is reset. The timer is intended to allow the vehicle time to stop for ordinary traffic, such as at traffic lights, without ending the present trip and having to perform parts of method 500 over again.

Figure 7:
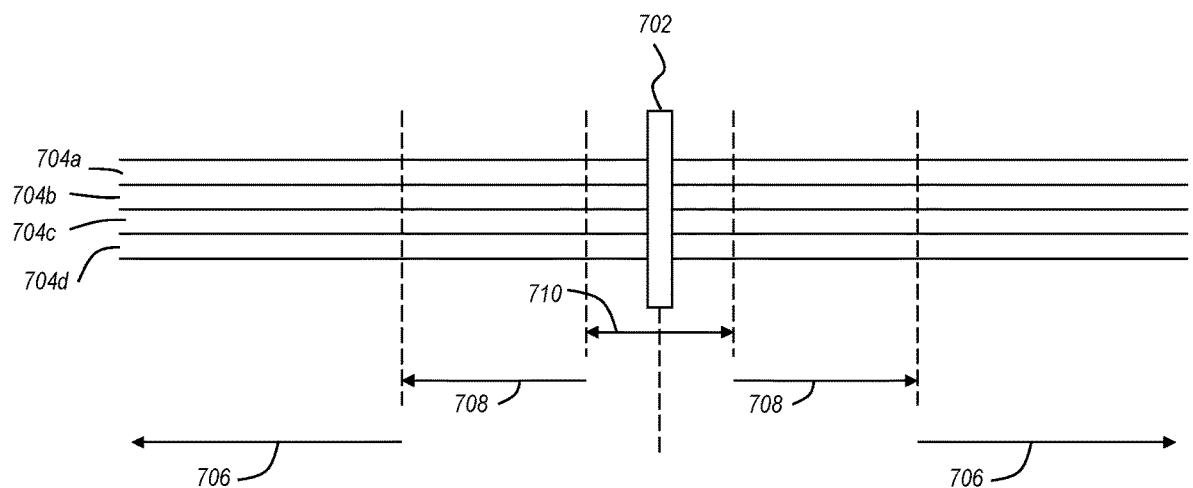
FIG. 7 shows a geofenced diagram around a tolling location over several lanes of a toll roadway where the location sampling rate is adjusted to allow identification of co-located mobile devices without the need to look at PAN connections, in accordance with some embodiments.

FIG. 7 shows a geofenced diagram around a tolling location 702 over several lanes 704*a-d* of a toll roadway where the location sampling rate is adjusted to allow identification of co-located mobile devices without the need to look at PAN connections, in accordance with some embodiments. A first geofenced region 710 is defined within a relatively short distance of the tolling location 702, before and subsequent to the tolling location 702. The distance can be, for example, on the order of 200 meters. When mobile devices are in this region, they take location fixes at a high rate, such as, for example, every 5 meters. This location data is reported to the tolling service data center. Outside of region 710 is another region 708 that extends out from region 710 to, for example, about half a mile or 800 meters. In this region 708 the mobile device is sampling location at a rate of about every 20 meters. Beyond region 708, in regions 706, which can extend out one and a half to two miles, the mobile device samples location at about once every 200 meters, and location information is not reported to the tolling service data center.

The location information reported while the mobile device is in regions 708 and 710 allows statistical correlations of mobile devices to be made to obviate the need to determine if the mobile devices see the same PAN MAC addresses. The high location granularity allows clusters of mobile devices to be identified that must be in the same vehicle based on being in the same lane, traveling at the same speed, being at about the same locations at the same times. Crossing time and speed can be used to group mobile devices, and then a mean distance among the mobile devices can be determined. Those who fall outside of a standard deviation of distance can be regarded as outside of the vehicle of those that all fall within standard deviation. That is, those mobile devices in the same vehicle will be closer together, and thus their location reports will indicate that they are closer together. Although different mobile devices can reports and different times, their speed, and time information can be used to interpolate location at other times between the reported location fix information. Since the locations are reported over two hundred meters at five meter intervals, for example, there are approximately forty location fixes that be compared. in the region before passing through the tolling location as well as after the tolling location. Once a cluster of two or more mobile devices are found, if none of the mobile devices has reporting or indicated being connected to the vehicle audio system, then the information is transmitted to the tolling agency to further correlate the mobile devices with a license plate image in order to determine the account that is to be charged the toll fee.

Furthermore, mobile devices that are associated with the same toll account can be identified which can indicate that only one of the mobile devices associated with the tolling account, if any, will be charged the toll fee. For example, in vehicle occupied by a family, there can be two mobile devices associated with one toll account. In that case only one toll fee may be charged. However, consider the case where two family members who share an account are riding with a third party who has a separate toll account. In that case the methods described herein allow the tolling service to determine which of the parties is to be charged the toll fee, but the mobile devices using a shared account can be considered as one for the purposes of evaluating which party will be assessed the toll fee.

What is claimed is:

1. A method, comprising:

receiving at a server a plurality of location reports from a plurality of mobile devices, each location report including a location and a time at which a location fix was performed to obtain the location, wherein each mobile device of the plurality of mobile devices generates the location reports by monitoring a speed of the mobile device based on location fixes provided by a satellite positioning receiver of the mobile device over time, and when the speed of the mobile device is above a threshold speed, obtaining the location and time from the satellite positioning receiver of the mobile device for the location report, and a personal area network transceiver (PAN) media access control (MAC) address of another device read by the mobile device at the time of generating the location report using a PAN transceiver of the mobile device;

evaluating, by the server, each one of the plurality of location reports to determine whether there is another location report from a different mobile device that correlates in location, time, and MAC address to the one of the plurality of location reports being evaluated;

identifying, by the server, another location report from the different mobile device that correlates with the one of the plurality of location reports being evaluated in time, location, and MAC address, and in response the server determining that the different mobile device has read a common MAC address of the one of the plurality of location reports being evaluated; and in response to identifying the another location report, the server assessing a single toll fee to an account associated with one of the mobile devices and not assessing a toll fee to an account associated with the another mobile device.

2. The method of claim 1, wherein determining whether the mobile devices that produced the correlated location reports have read the common media access control address comprises:

each of the mobile devices determining that they are in a vehicle based on reaching a threshold speed and reading a MAC address of a vehicle audio system of the vehicle.

3. The method of claim 1, further comprising, when it is determined that the mobile devices is paired with the vehicle audio system, an account associated with the mobile device that is paired with the vehicle audio system is charged the full toll.

4. A method, comprising:

receiving at a server a plurality of location reports from a plurality of mobile devices, each of the location reports including a location and a time at which a location fix was performed to obtain the location, wherein each mobile device of the plurality of mobile devices generates the location reports by monitoring a speed of the mobile device based on location fixes provided by a satellite positioning receiver of the mobile device over time, and when the speed of the mobile device is above a threshold speed, obtaining the location and time from the satellite positioning receiver of the mobile device for the location report, and a media access control (MAC) address of a personal area network (PAN) transceiver of a vehicle read by the mobile device at the time of generating the location report using a PAN transceiver of the mobile device, and an indication whether the mobile device is actively connected to the PAN transceiver of the vehicle;

the server evaluating each one of the plurality of location reports to determine whether there is another location report from a different mobile device that correlates to the one of the plurality of location reports being evaluated based on the location and the time indicated in the location reports;

upon the server identifying one or more correlated location reports, the server determining whether the mobile devices that produced the correlated location reports have each read a the vehicle PAN MAC address; and when it is determined that the mobile devices have each read the the vehicle PAN MAC address, the server applying a business rule to apportion a single toll fee among the mobile devices that have read the common media access control address.

5. The method of claim 4, wherein the business rule results in the entire single toll fee to be assessed to a mobile device that is connected to the personal area network transceiver of the vehicle.

6. The method of claim 4, wherein the business rule results in the single toll fee being divided among the mobile devices.

7. A method for identifying a plurality of mobile devices traveling together in a vehicle, comprising:

receiving, at a server, a plurality of location reports from a plurality of mobile devices, wherein the location reports are produced by each mobile device by monitoring a speed of the mobile device based on location fixes produced by a satellite positioning receiver of the mobile device over time, and when the speed is above the a speed threshold, generating location reports to include location fix information produced by the satellite positioning receiver, taken when approaching and passing through a tolling location in order to complete a toll transaction, the location fix information including a location and a time at which the location fix was performed, and a media access control (MAC) address of a personal area network (PAN) transceiver of the vehicle read by the mobile device using a PAN transceiver of the mobile device, and an indication whether the mobile device is actively connected to the PAN transceiver of the vehicle;

the server selecting a first location report from one mobile device of the plurality of mobile devices that indicates the one mobile device passed through the tolling location;

the server defining speed and distance boundaries based on location information in the first location report;

the server searching the plurality of location reports to identify other ones of the location reports that are within the speed and distance boundaries and having a similar crossing time and lane location when crossing the tolling location based on a defined lane geofence;

the server performing a statistical process on the speed, location, crossing time, and lane of the other ones of the location reports to identify at least one other location report from at least one other mobile device that has a minimum likelihood of being in the same vehicle as the one mobile device; and wherein at least one of the first location report or the at least one other location reporting indicating that the respective mobile device is actively connected to the PAN transceiver of the vehicle, the server automatically assessing a toll fee to at least a toll account associated with the respective mobile device indicating that it is connected to the PAN transceiver of the vehicle.

8. The method of claim 7, wherein the entire toll fee is assessed to the toll account associated with the respective mobile device indicating that it is connected to the PAN of the vehicle.

9. The method of claim 7, wherein performing a statistical process comprises determining a mean distance and a standard deviation in distance among the other ones of the location reports and the first location report, and excluding those of the other ones of the location reports that are more than the standard deviation away from the location of the first location report.

10. The method of claim 9, wherein each of the plurality of location reports includes a sequence of locations.

11. The method of claim 10, wherein the sequence of location reports are produced only within a defined distance from the tolling location.

* * * * *